US009151270B2

(12) United States Patent
Eisenberg et al.

(10) Patent No.: US 9,151,270 B2
(45) Date of Patent: Oct. 6, 2015

(54) FLATBACK SLAT FOR WIND TURBINE

(75) Inventors: Drew Eisenberg, Boulder, CO (US); Peder Bay Enevoldsen, Vejle (DK)

(73) Assignee: Siemens Aktiengesellschaft, München (DE)

( * ) Notice: Subject to any disclaimer, the term of this patent is extended or adjusted under 35 U.S.C. 154(b) by 693 days.

(21) Appl. No.: 13/477,469

(22) Filed: May 22, 2012

(65) Prior Publication Data

US 2013/0259702 A1  Oct. 3, 2013

Related U.S. Application Data

(63) Continuation-in-part of application No. 13/438,040, filed on Apr. 3, 2012.

(51) Int. Cl.
*F03D 1/06* (2006.01)
(52) U.S. Cl.
CPC ............. *F03D 1/0641* (2013.01); *Y02E 10/721* (2013.01); *Y02E 10/722* (2013.01)
(58) Field of Classification Search
CPC ........................... F03D 1/0641; Y02E 10/722
USPC .................... 416/23; 415/4.1, 4.3; 290/44, 55
See application file for complete search history.

(56) References Cited

U.S. PATENT DOCUMENTS

| | | | | |
|---|---|---|---|---|
| 2,135,887 | A * | 11/1938 | Fairey | 416/23 |
| 7,585,157 | B2 | 9/2009 | Quell et al. | |
| 7,828,523 | B2 | 11/2010 | Bonnet | |
| 2003/0091436 | A1 * | 5/2003 | Stiesdal | 416/1 |
| 2003/0215332 | A1 * | 11/2003 | Torok et al. | 416/1 |
| 2003/0215333 | A1 * | 11/2003 | Bernhard et al. | 416/23 |
| 2008/0166241 | A1 | 7/2008 | Herr et al. | |
| 2009/0263252 | A1 * | 10/2009 | Slot | 416/223 R |
| 2010/0143152 | A1 * | 6/2010 | Subramanian et al. | 416/90 R |
| 2010/0303630 | A1 * | 12/2010 | Gandhi | 416/223 R |
| 2011/0206509 | A1 * | 8/2011 | Benito Santiago et al. | 416/23 |

(Continued)

FOREIGN PATENT DOCUMENTS

DE  202008006801 U1  4/2009
EP  2078852 A2  7/2009

(Continued)

OTHER PUBLICATIONS

Gaunaa, M., Sorensen, N, and Bak, C. "Thick Multiple Element Airfoils for use on the Inner Part of Wind Turbine Rotors" Torque: 2010. pp. 135-152, 2010, EWEA.

(Continued)

*Primary Examiner* — Edward Look
*Assistant Examiner* — Aaron R Eastman

(57) ABSTRACT

An aerodynamic slat (30F) having a flatback trailing edge (44F) extending along and spaced proximate an inboard portion of a wind turbine blade (22). At least the leading edge (42F) of the slat may be disposed within a zone (48) of airflow that is generally parallel to the suction side (40) of the wind turbine blade over a range of air inflow angles. A splitter plate (52) may extend aft from the flatback trailing edge to reduce vortex shedding and extend the effective chord length of the slat. Vortex generators (60) may be attached to the slat. Flatback slats may be retrofitted to a wind turbine rotor (20) by attaching them to the spar caps (56) of the blades or to the hub spinner (28). The flatback slat provides lift on low-lift inboard portions of the wind turbine blade over a range of angles of attack of the inboard portion.

20 Claims, 8 Drawing Sheets

(56) References Cited

U.S. PATENT DOCUMENTS

2011/0223022 A1* 9/2011 Wang et al. ............ 416/23
2012/0134815 A1* 5/2012 Carroll et al. .......... 416/23

FOREIGN PATENT DOCUMENTS

| NL | 1035525 | 7/2008 |
|----|---------|--------|
| WO | 2007105174 A1 | 9/2007 |
| WO | 2007114698 A2 | 10/2007 |
| WO | 2009146810 A2 | 12/2009 |
| WO | 2010133584 A1 | 11/2010 |
| WO | 2010133585 A1 | 11/2010 |
| WO | 2010133587 A1 | 11/2010 |
| WO | 2010133591 A1 | 11/2010 |
| WO | 2010133594 A1 | 11/2010 |
| WO | 2010133649 A2 | 11/2010 |
| WO | 2010145902 A1 | 12/2010 |

OTHER PUBLICATIONS

Chow, Raymond and Van Dam, C.P. "Inboard Stall and Separation Mitigation Techniques on Wind Turbine Rotors" 49th AIAA Aerospace Sciences Meeting. Jan. 4-7, 2011.
Heinzelmann, B., Gollnick, B. Thamsen, P., Petsche, P. and Christiansen, J. "Investigations into Boundary Layer Fences in the Hub Area of Wind Turbine Blades". EWEC 2008.

* cited by examiner

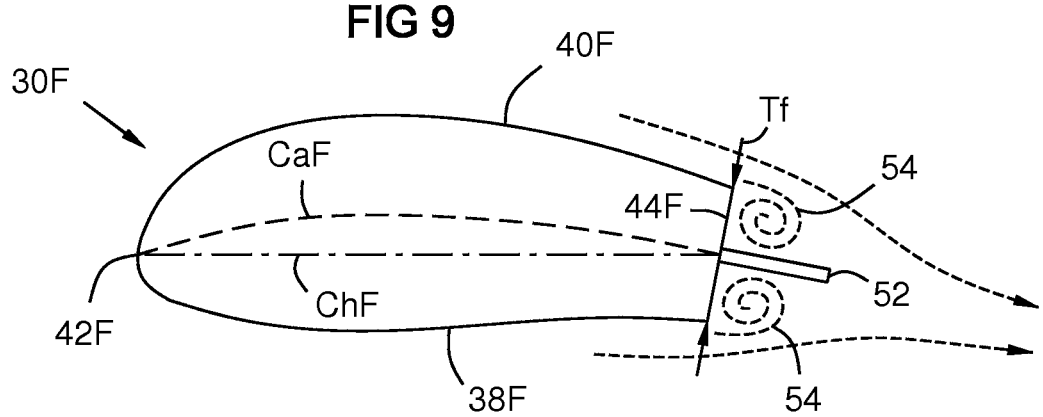
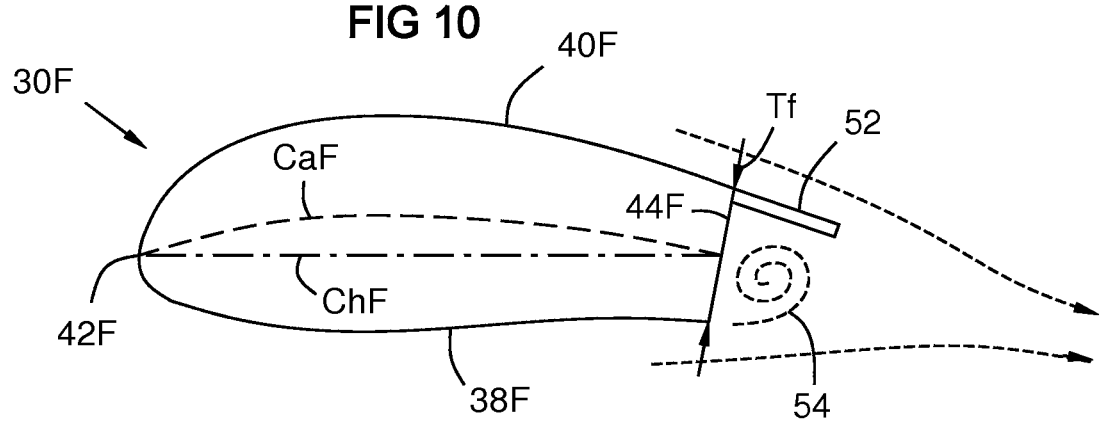
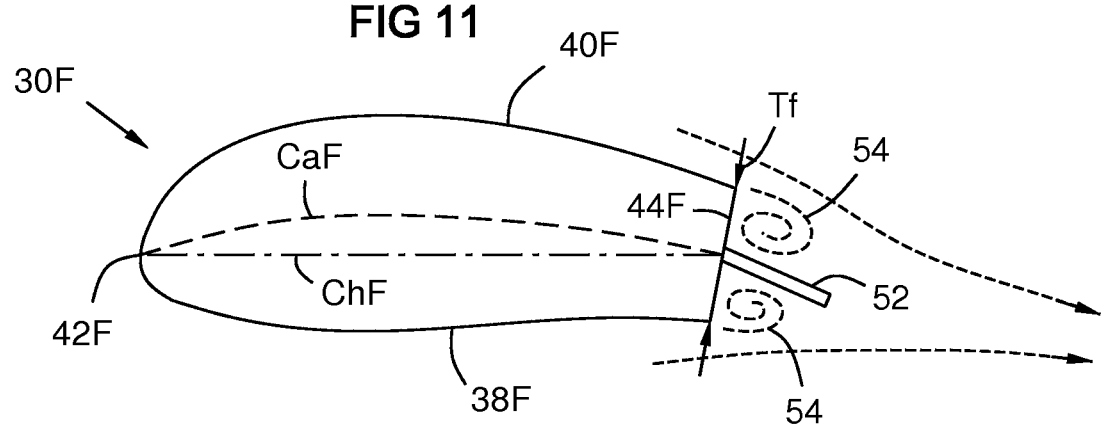

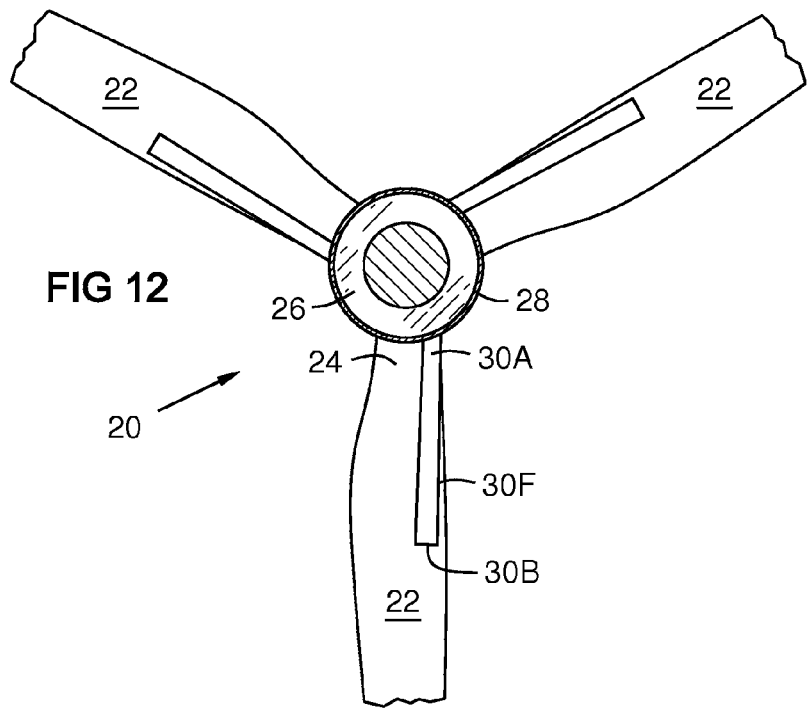
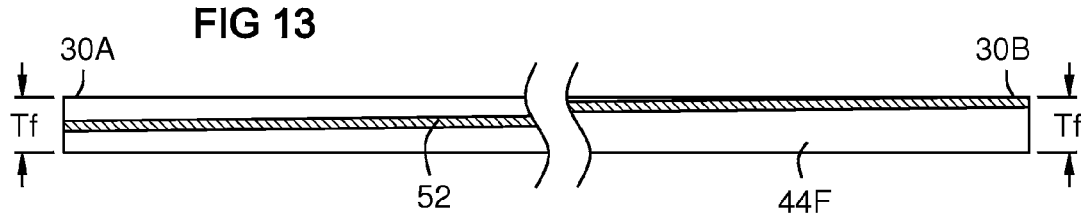
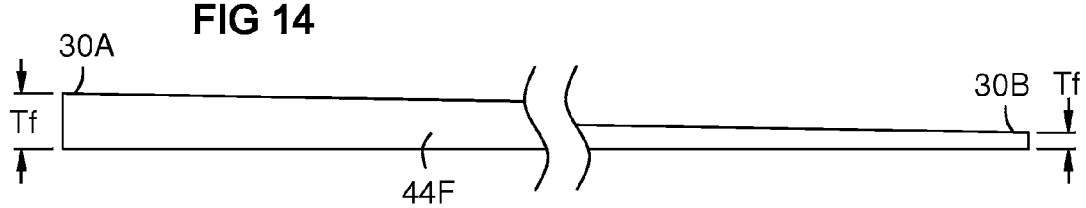
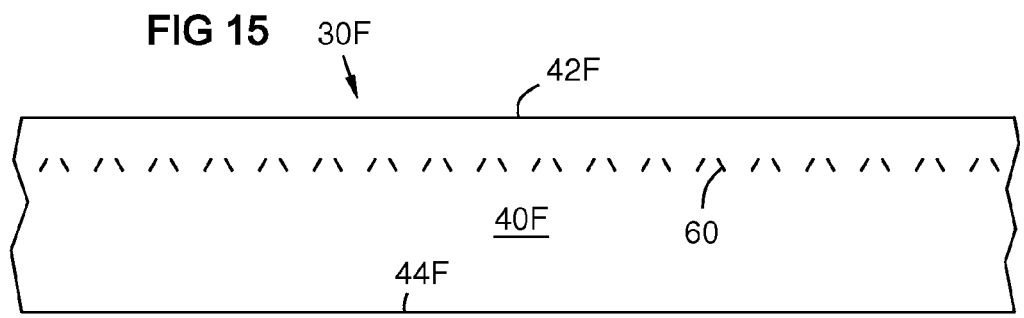

Contours of variation in flow angles with an 8° variation in inflow angle of relative wind Vr

FLATBACK SLAT FOR WIND TURBINE

This application is a continuation-in-part of U.S. application Ser. No. 13/438,040 filed on 3 Apr. 2012 which is incorporated by reference herein in its entirety.

FIELD OF THE INVENTION

The invention relates generally to wind turbines and more particularly to an inboard slat for a wind turbine blade.

BACKGROUND OF THE INVENTION

The inboard portion of a wind turbine blade is made thick to support centrifugal and lift loads that are imposed onto the blade root by the outboard blade regions. Herein "inboard" means radially inward toward the blade root, which is the portion of the blade connected to the hub. "Outboard" means radially outward, or toward the blade tip. The inboard portion of each blade becomes progressively thicker perpendicular to the airfoil chord toward the hub for strength, and typically becomes cylindrical adjacent to the hub to facilitate mounting and interface with a blade pitch adjustment mechanism. The relative air inflow angle changes with distance from the rotation center due to the increasing blade speed relative to the incoming wind. For manufacturing reasons, the chord angle or twist angle of the blade cannot change fast enough to provide the optimal orientation of the blade airfoil section to the relative air inflow direction, resulting in an increasingly excessive angle of attack proximate the root. These inboard portions experience high variations of angle of attack due to the coning angle, wind speed variations, and low speed of the blade. Due to the blade thickness, structural limitations in airfoil shape, and high angle of attack, the inboard portion of the blade is aerodynamically inefficient, and may even be permanently stalled, reducing the wind energy conversion efficiency. Herein "angle of attack" means the angle between the airfoil chord line and the relative wind vector, taking the blade rotation into account. A stalled condition occurs when the angle of attack is too high and the air passing over the suction side of the airfoil detaches from the surface of the blade, creating a separated flow region. Thus, the inboard region of the blades produces low lift and consequently low torque, and it therefore contributes little to the power of the wind turbine. Flow altering devices including slats and flaps have been added to wind turbine blades to improve their local and overall aerodynamic performance.

BRIEF DESCRIPTION OF THE DRAWINGS

The invention is explained in the following description in view of the drawings that show:

FIG. 9 shows a splitter plate extending aft from mid-thickness of a flatback trailing edge.

FIG. 10 shows a splitter plate extending aft from a flatback trailing edge flush with the suction side of the slat.

FIG. 11 shows a splitter plate angled downward from a flatback trailing edge.

FIG. 12 shows one embodiment in which flatback slats are attached to the spinner of a wind turbine rotor.

FIG. 13 shows a back view of one embodiment of a flatback trailing edge in which a splitter plate migrates from a midpoint to an upper part of the trailing edge thickness.

FIG. 14 shows a back view of one embodiment of a flatback trailing edge with a thickness that tapers along a radial span of the slat.

FIG. 15 shows a suction side view of one embodiment of a flatback slat with vortex generators along a forward suction side of the slat.

DETAILED DESCRIPTION OF THE INVENTION

Figure 1:
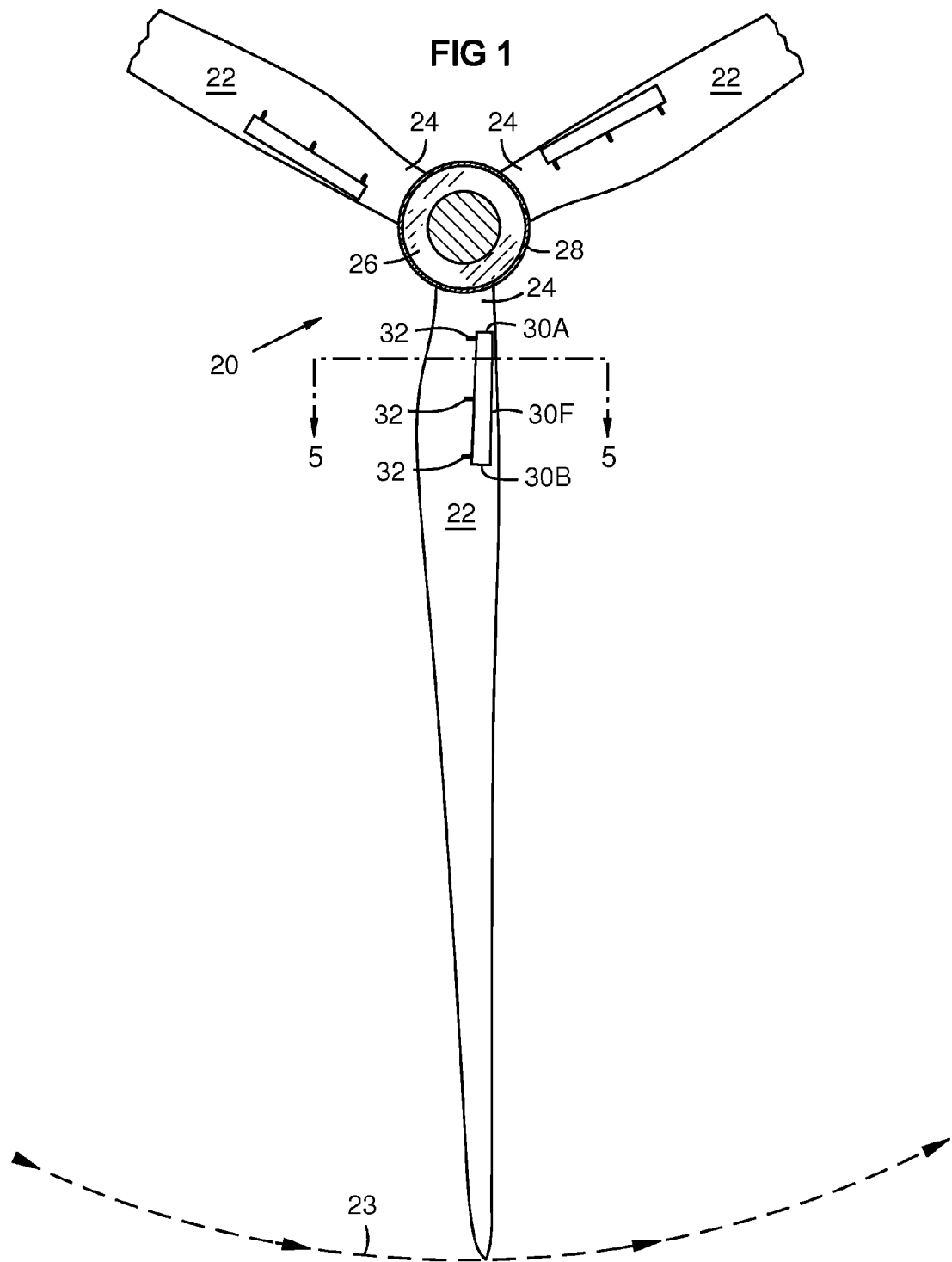
FIG. 1 shows a downwind side of a wind turbine rotor according to an embodiment of the invention.

FIG. 1 shows a downwind side of a wind turbine rotor 20 with radially-oriented blades 22, sometimes referred to as airfoils or main elements, which rotate generally in a plane 23 or disc of rotation. Only rotating elements are illustrated in this figure, with the typical nacelle and tower of a wind turbine not being shown. Each main blade 22 has a radially inboard end or root 24. The roots 24 are attached to a common hub 26 that may have a cover called a spinner 28. Each blade may have an aerodynamic flatback slat 30F as described herein mounted above an inboard portion of each blade 22 by mounting structures such as aerodynamic struts 32 or rods or stall fences.

Figure 2:
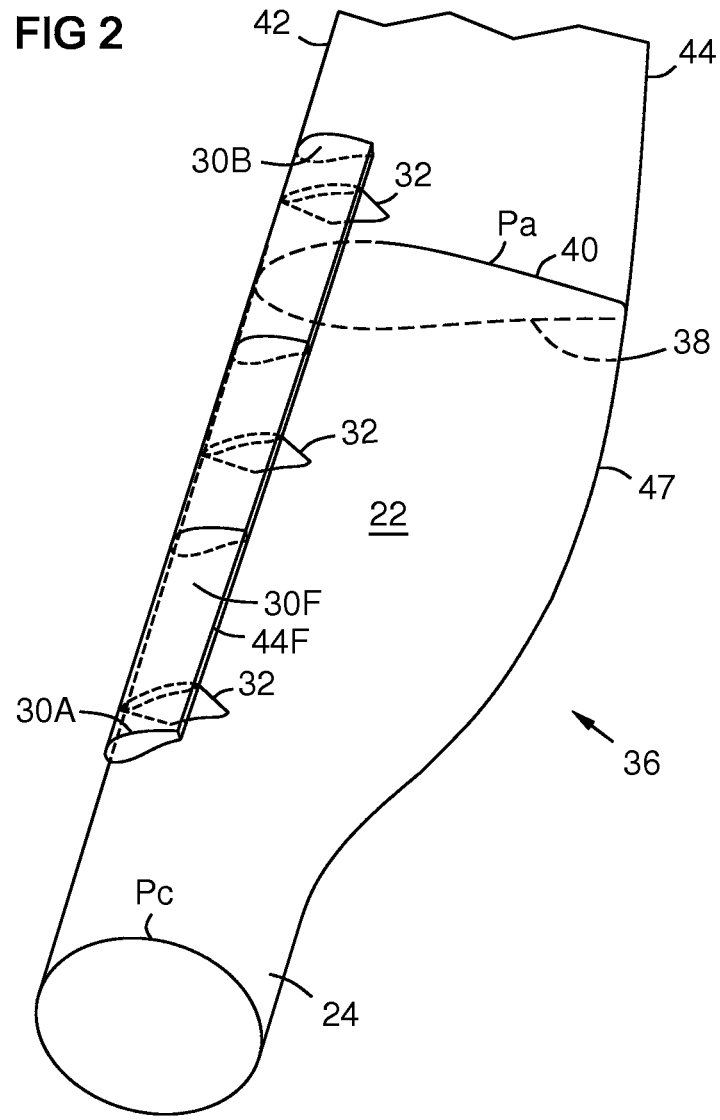
FIG. 2 is a perspective view of an inboard portion of a wind turbine blade according to an embodiment of the invention.

FIG. 2 is a perspective view of an inboard portion 36 of a blade 22 having a pressure side 38 and a suction side 40 between a leading edge 42 and a trailing edge 44. The transverse sectional profiles may vary from cylindrical Pc at the root 24 to an airfoil shape Pa at or past the shoulder 47, which is the position of longest chord on the blade 22. A flatback slat 30F is shown as later described.

Figure 3:
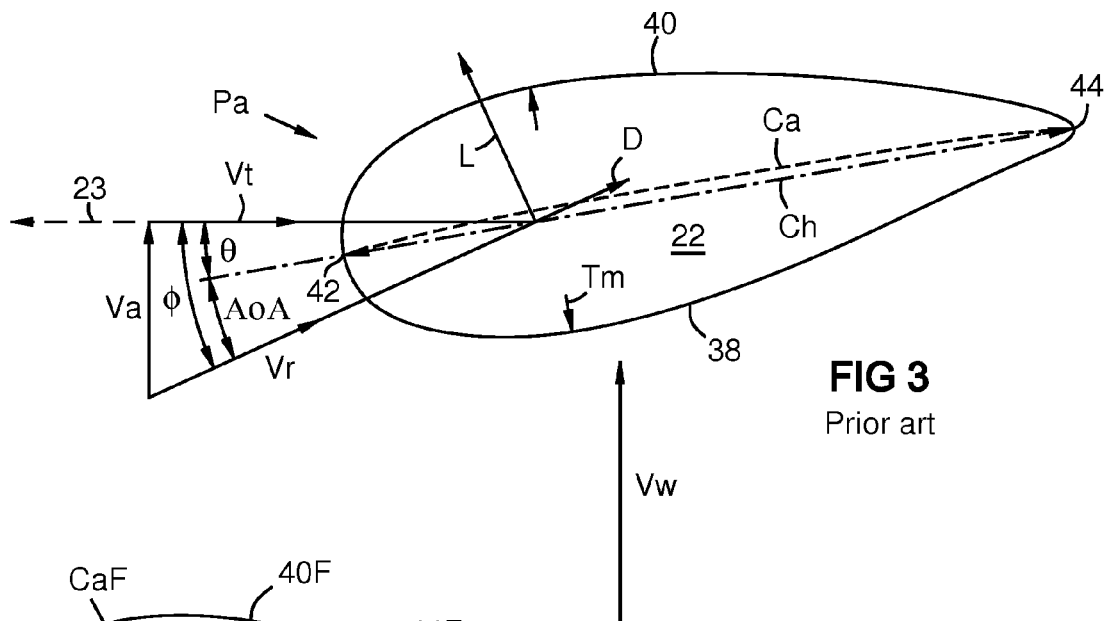
FIG. 3 shows a prior art wind turbine blade airfoil profile at a transverse section.

FIG. 3 illustrates a prior art wind turbine blade airfoil profile Pa with a pressure side 38 and a suction side 40. A straight chord line Ch spans between the leading edge 42 and the trailing edge 44. The length of the chord line Ch is the airfoil chord length. A mean camber line Ca is the set of midpoints between the pressure and suction sides 38, 40. The mean camber line Ca coincides with the chord line Ch if the airfoil Pa is symmetric about the chord line Ch. A maximum thickness Tm relative to the chord length of the airfoil may be used to define a degree of thickness or thinness of the airfoil profile.

Vector Vw represents the wind velocity outside the influence of the rotor. An axial free-stream vector Va represents the axial component of the air inflow at the blade 22 after reduction of the wind velocity Vw by an axial induction factor α. In the known formula below, $U_1$ is the wind speed outside the influence of the rotor and $U_2$ is the wind speed at the rotor.

$$\alpha \equiv \frac{U_1 - U_2}{U_1}$$

Combining Va with a tangential velocity component Vt gives a relative inflow vector Vr at an angle φ relative to the rotation plane 23. The angle of attack AoA is the angle between the relative inflow vector Vr and the chord line Ch. The twist angle θ is the angle between the chord line Ch and the rotation plane 23. The lift vector L is perpendicular to the relative inflow vector Vr. A drag vector D is directed aft parallel to the inflow vector Vr.

A design target for a wind turbine airfoil may be an axial induction factor α of about ⅓, giving an axial free-stream vector Va≈Vw·⅔. However, the axial induction factor α may be much less than ⅓ on the inner portion 36 of the blade due to aerodynamic stall or detachment, which can be attributed to the relatively high thickness Tm under the operating conditions, inefficient airfoil shapes, and the wide operating range of high angles of attack of the airfoil. A slat may be optimized for lift along this area of the main blade per aspects of the invention.

Figure 4:
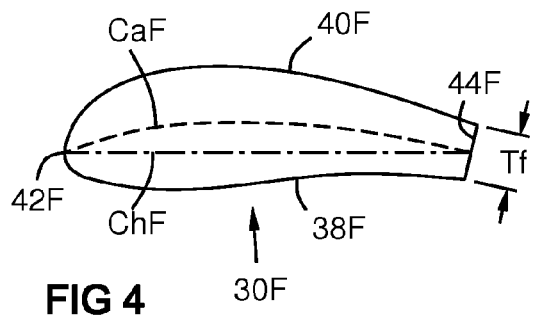
FIG. 4 shows a flatback slat airfoil profile at a transverse section of the slat.

FIG. 4 shows a profile of a flatback slat 30F, as may be used with embodiments of the present invention, with a chord line ChF from the leading edge 42F to a midpoint of a flatback trailing edge 44F, and a mean camber line CaF. A flatback slat herein is a slat with a flatback trailing edge 44F. This means the trailing edge comprises a flat or generally flat surface that is normal ±40° or ±30° to the mean camber line CaF or to the chord line ChF of the slat 30F in a transverse sectional profile. The flatback trailing edge 44F has a thickness Tf measured between the pressure side 38F and suction side 40F in the transverse profile of the slat. The thickness Tf may be at least 5% of the chord length ChF of the slat 30F or 5-30% or 5-12.5% of the chord length of the slat in various embodiments. The thickness of the flatback trailing edge 44F may decrease with increasing distance from the root 24 of the main blade element as shown in FIG. 14.

Figure 5:
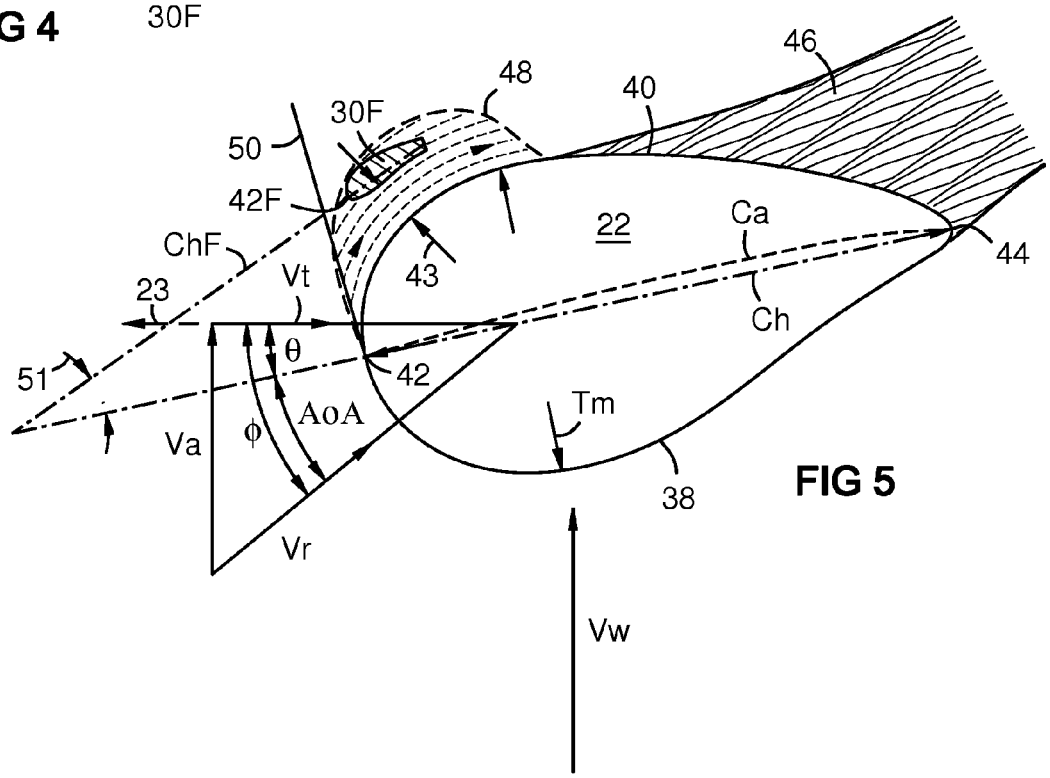
FIG. 5 shows a profile of an inner portion of a wind turbine blade taken along line 5-5 of FIG. 1.

FIG. 5 shows an exemplary profile of the inner portion of the main blade 22, which receives inflow Vr at a greater angle of attack AoA than in FIG. 3. A stalled or separated airflow region 46 is shown. There is a zone 48 above the forward suction side 40 of the main blade element 22 in which the airflow is generally parallel to the suction side 40, such as parallel ±6° or ±4°, throughout a variation of at least 8° in inflow angle φ to the main blade element, such as for inflow angles of attack anywhere between −10 degrees and 30 degrees. This means tangents to the flow lines in zone 48 are generally parallel ±6° or ±4° to respective tangents to the profile of the suction side 40. Within a similar zone, also represented herein by numeral 48, a change of N degrees in the angle of attack AoA to the main blade element 22 results in a change in an air inflow angle to the slat of only up to N/2 degrees throughout a variation of at least 8° in inflow angle φ to the main blade element. The present inventors have realized that if the slat 30F is disposed in this zone 48, or if at least the leading edge 42F of the slat 30F is disposed in this zone 48, the slat receives a more consistent air inflow angle over a range of angles of attack AoA of the main element 22. This allows effective slat performance under a broader range of operating conditions (high variance in AoA) than prior art devices which position a slat forward of the zone 48.

In one embodiment, the slat 30F may be disposed behind a line 50 drawn perpendicularly to the mean camber line Ca of the main blade element 22 at the leading edge 42 thereof. The slat may be spaced at a distance 43, measured at the minimum distance point in the illustrated cross-sectional view, from the suction side 40 of the inboard portion of the main blade element 22 throughout a radial span of the slat. The distance 43 of the slat 30F from the suction side 40 of the main blade element 22 may be for example 5% to 10% of a selected chord length Ch of the main blade element 22. The selected chord length Ch may be the maximum chord length at the shoulder 47 (FIG. 2), or the average chord length of the main blade element 22 along the span of the slat. Alternately, a spacing distance 43 may be determined for each transverse section along the radial span of the slat, causing the distance 43 to vary along the span of the slat. The chord length ChF of the slat 30F may be for example 10%-40% or 12.5%-40% or 15%-40% of the selected or local chord Ch of the main blade element in various embodiments.

Figure 6:
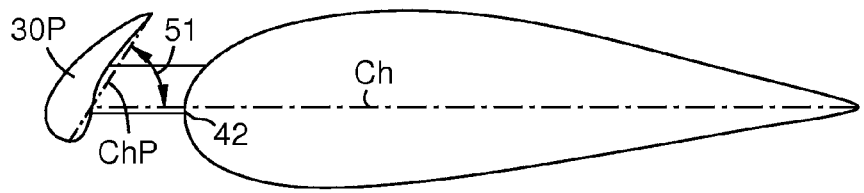
FIG. 6 shows a prior art slat and blade profile.
Figure 7:
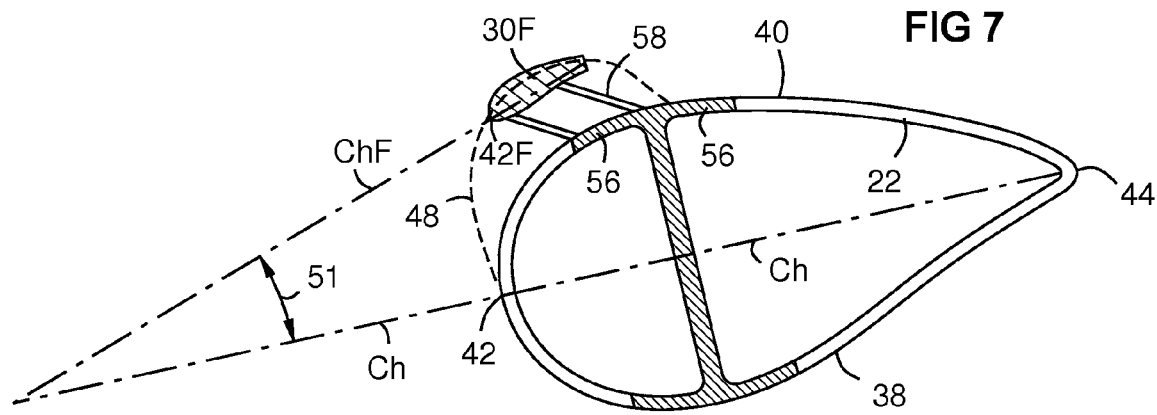
FIG. 7 shows attachment of one embodiment of the present slat to a spar cap.

A slat chord line ChF may be defined per transverse section of the slat 30F between the leading edge 42F and a midpoint of the flatback trailing edge 44F. The divergence angle 51 between the chord line ChF of the slat 30F and the respective chord line Ch of the main element 22 may be for example 10° to 30°. Prior slats 30P as shown in FIG. 6 are commonly located forward of the leading edge 42, and have a chord divergence angle 51 between ChP and Ch of 70° to 90°. They are positioned to delay stall on the main element, rather than for slat lift. They can produce some lift, but only at high angles of attack. The present slat 30F may be disposed in zone 48 throughout a radial span of the slat, or at least the leading edge 42F may be so disposed. This locates the slat 30F where it can provide lift over a broader range of operating conditions. This position also allows the slat to be attached to the spar cap 56 of the main blade element 22, as shown in FIG. 7, where it is easier to attach solidly than in the prior slat position of FIG. 6, making a retrofit attachment kit practical. Such a kit may include the slat 30F, a support structure such as rods 58 or struts 32 (FIG. 2) for connecting the slat to an existing wind turbine rotor, and optionally, fastening devices such as screws, blind bolts, and/or adhesive. The chord divergence angle 51 may decrease over the span of the slat with distance from the root 24 of the main blade element 22, because the twist as a function of radial span is different between the main element 22 and the slat 30F; i.e. a twist rate in the slat may exceed a corresponding twist rate of the main element 22 along the radial span of the slat.

Figure 8:
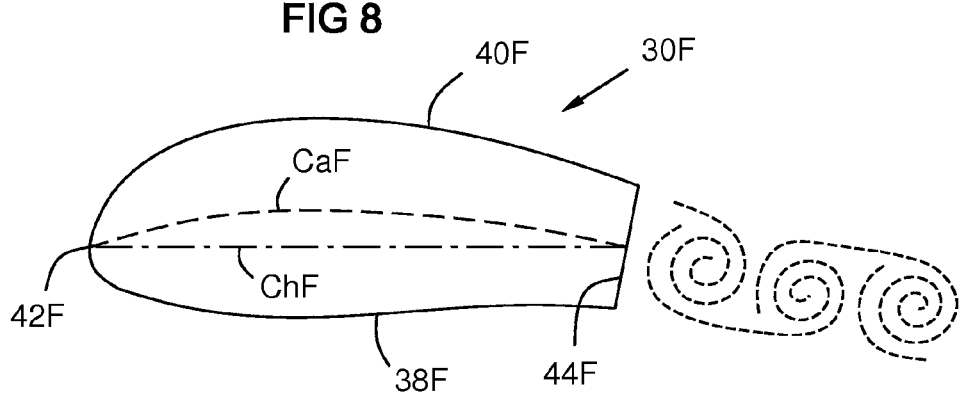
FIG. 8 shows a flatback slat producing vortex shedding.

FIG. 8 shows a flatback slat 30F producing von Karman vortex shedding as may occur under some conditions. To avoid this, FIG. 9 shows a splitter plate 52 extending aft from the flatback trailing edge 44F. The splitter plate 52 prevents vortex shedding when it would otherwise occur by holding two stationary vortices 54 against the trailing edge 44F. This extends the effective chord length ChF of the slat, and promotes off-surface pressure recovery for the flow over the suction side of the slat. Shedding vortices create oscillating/fluctuating pressure fields across the flat trailing edge 44F and thus create a large amount of pressure drag. By adding a splitter plate 52, and creating standing vortices 54, the fluctuating flow is replaced with a quasi-steady one, and drag is reduced. An additional benefit is that the aerodynamic influence of the slat is extended further downstream, which further speeds the flow between the slat and the main element, and delays the onset of flow separation on the main element 22. The splitter plate 52 may extend aft from the flatback trailing edge 44F by a distance effective to prevent Karman vortex shedding from the flatback trailing edge, for example by a distance of at least 5% of the chord length of the slat. In one embodiment, the splitter plate 52 may extend aft from the flatback trailing edge 44F from a midpoint in the thickness Tf of the flatback trailing edge. In one embodiment, the splitter plate 52 may be oriented normally ±20° to the flatback trailing edge 44F. In FIG. 10 the splitter plate 52 extends aft from the flatback trailing edge flush with a suction side 40F of the slat 30F, thus forming an aft extension of the suction side of the slat, increasing lift on the slat. In FIG. 11 the splitter plate 52 is angled downward or toward the main blade element, such as up to 30° relative to the camber line CaF at the flatback slat trailing edge Tf. This increases the nozzle effect between the slat and the main blade element 22. The splitter plate 52 may have a thickness of less than 20% of the thickness Tf of the flatback trailing edge 44F, and it may be a flat plate. The splitter plate 52 may leave space for at least one stationary vortex proximate the flatback trailing edge 44F; i.e. it does not form a flush extension of both the pressure and suction sides 38F, 40F. The splitter plate 52 may migrate from a midpoint on the thickness Tf of the flatback trailing edge 44F at an inboard end 30A of the slat 30F to an upper part of the flatback trailing edge at an outboard end 30B of the slat, as later shown in FIG. 13.

FIG. 12 shows one embodiment of the invention in which flatback slats 30F are attached to the hub 26 of the wind turbine rotor 20, so as to extend along, and be spaced proximate, the inboard portion of the blade 22. This embodiment may be provided in a retrofit kit for attaching the slats 30F to an existing wind turbine rotor. For example, the support structure of the kit may contain rings, plates, or brackets that can be bolted to the hub or spinner. Alternately, the support structure may include a replacement spinner fabricated with slat mounts.

FIG. 13 shows a back view of one embodiment of a flatback trailing edge 44F with a splitter plate 52 that migrates from a midpoint on the thickness Tf of the flatback trailing edge 44F at an inboard end 30A of the slat to an upper part of the flatback trailing edge 44F at an outboard end 30B of the slat.

FIG. 14 shows a back view of one embodiment of a flatback trailing edge 44F in which the thickness Tf of the flatback trailing edge decreases with increasing distance from a root of the main blade element. Inboard end 30A of the slat is closer to the root 24 of the main blade element than is the outboard end 30B of the slat.

Figure 16:
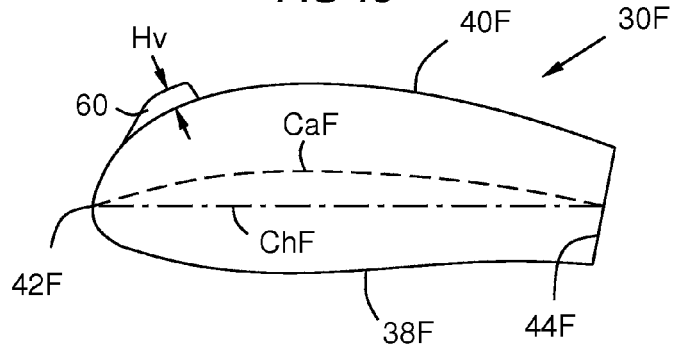
FIG. 16 shows a profile of a flatback slat with a vortex generator.

FIG. 15 shows a suction side view of one embodiment of a flatback slat 30F with a suction side 40F, a leading edge 42F, a trailing edge 44F, and a plurality of vortex generators 60 along the forward suction side 40F of the slat 30F. FIG. 16 shows a profile of a flatback slat 30F with a pressure side 38F, a suction side 40F, a leading edge 42F, a trailing edge 44F, a chord line ChF, a mean camber line CaF, and a vortex generator. The height Hv of the vortex generators 60 may be for example at least 80% of a boundary layer thickness on the slat. The vortex generators 60 reduce flow separation on the aft suction side of the flatback slat. They may also reduce vortex shedding behind the flatback trailing edge 44F. They may be used synergistically with the splitter plates 52 previously described, or they may be used without splitter plates. In addition to their effects on the slat, they may also reduce flow separation on the suction side 40 of the main blade element 22. The retrofit options previously described for installing the slats provide a way to reduce flow separation on the main blade 22 via vortex generators 60 on the slats 30F.

Figure 17:
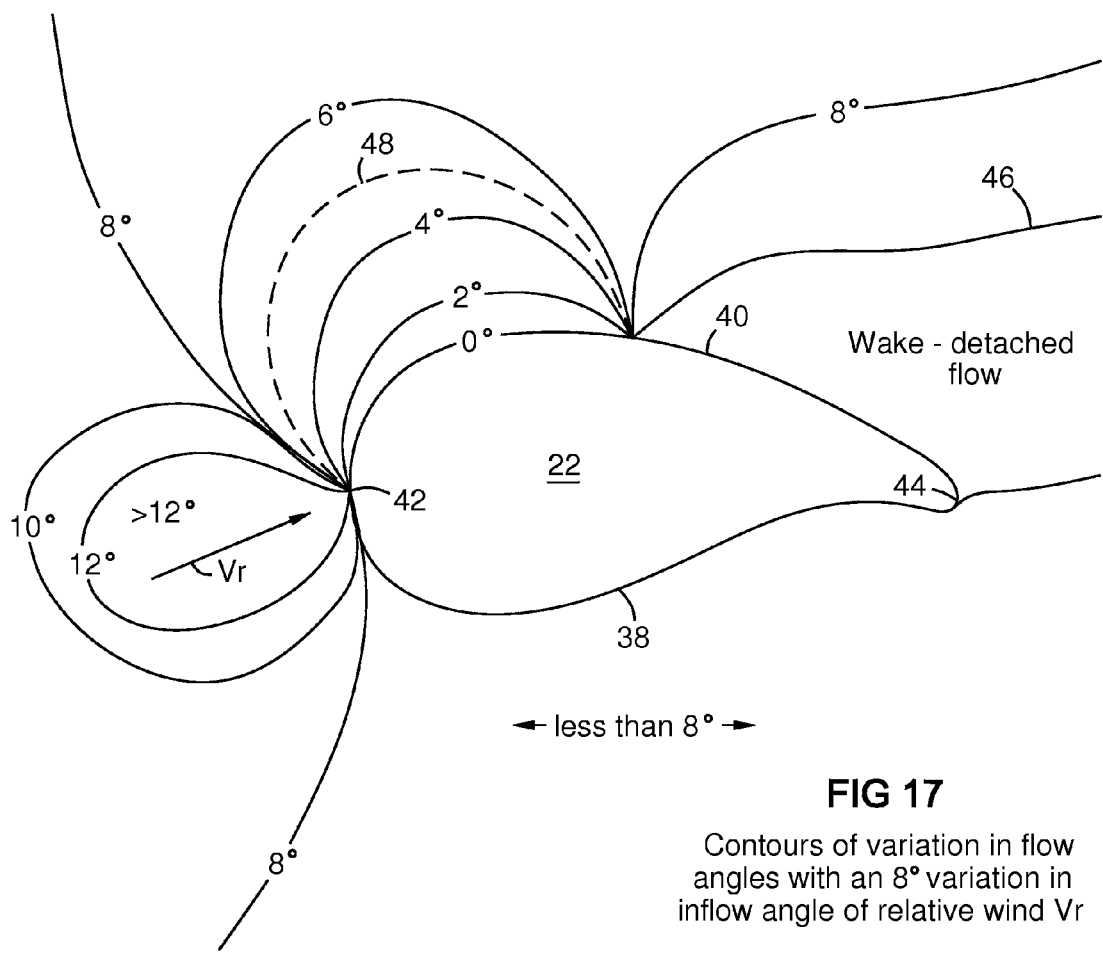
FIG. 17 shows exemplary contours of variation in flow angles about a turbine blade with an 8° variation in inflow angle of the relative wind.

FIG. 17 shows exemplary contours of variation in flow angles about a turbine blade with an 8° variation in inflow angle of the relative wind Vr. From such contours a zone 48 of parallel flow or reduced variation in inflow angle as previously described may be selected for positioning a slat 30F therein.

Figure 18:
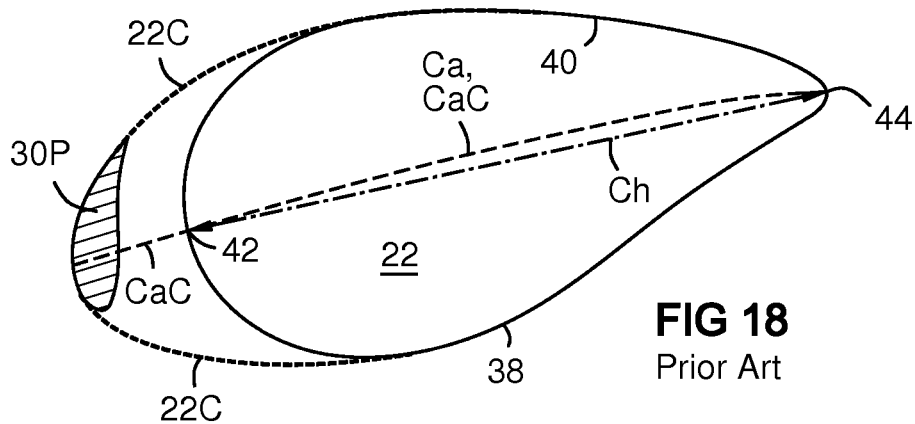
FIG. 18 shows a mean camber line of a prior art multi-element airfoil.
Figure 19:
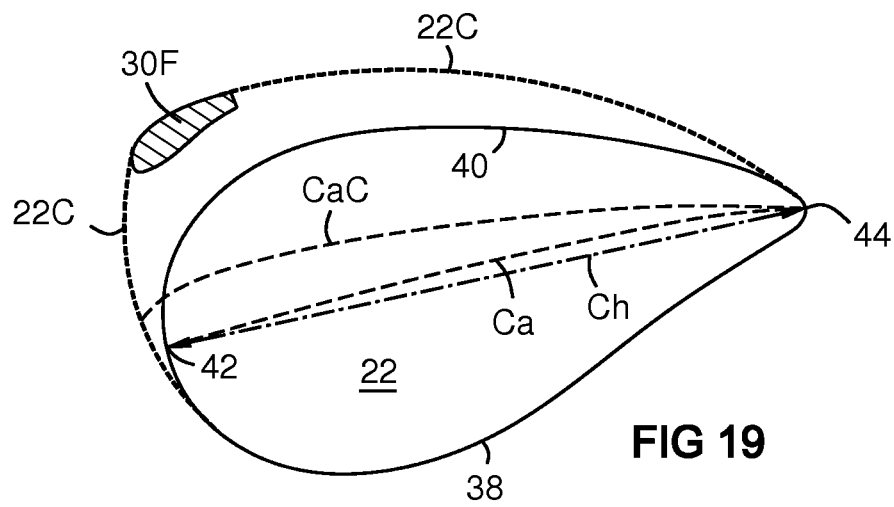
FIG. 19 shows a mean camber line of a multi-element airfoil in an embodiment of the present invention.

FIG. 18 shows a prior art slat 30P located forward of the main airfoil element 22, thus extending the effective length of the combined multi-element airfoil 22C. The mean camber line CaC of the multi-element airfoil 22C is extended forward, but is not changed in curvature. Consequently, the prior slat 30P does not increase lift at all angles of attack. As shown in FIG. 19, the present slat 30F being located in zone 48 (shown in FIG. 5), increases the curvature of the effective mean camber line CaC of the multi-element airfoil 22C, and therefore increases the lift it produces at all angles of attack.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A wind turbine blade comprising:
   a main blade element comprising a radially inboard portion; and
   a flatback slat comprising a flatback trailing edge spaced proximate the main blade element along a radial span of the inboard portion in a transverse sectional view thereof;
   wherein at least a portion of a leading edge of the slat is disposed within a zone of parallel flow wherein an operational airflow flows parallel ±6° to a suction side of the main blade element throughout a variation of at least 8° in an inflow angle to the primary blade element.

2. The wind turbine blade of claim 1, wherein the flatback trailing edge comprises a generally flat surface that is normal ±30° to a mean camber line of the slat or to a chord line of the slat, and has a thickness of 5% to 30% of a chord length of the slat.

3. The wind turbine blade of claim 1, wherein the thickness of the flatback trailing edge decreases along a radial extent of the slat with increasing distance from a root of the main blade element.

4. The wind turbine blade of claim 1, wherein a line is defined perpendicular to a mean camber line of the main blade element at a leading edge of the main blade element, and the slat is disposed behind said line and spaced from a suction side of the inboard portion of the main blade element throughout a radial span of the slat.

5. The wind turbine blade of claim 1, wherein the slat is disposed within the zone of parallel flow throughout a radial span of the slat.

6. The wind turbine blade of claim 1, wherein at least a leading edge of the slat is disposed within a zone of reduced inflow angle variation, wherein, when an angle of an operational air inflow to the main blade element changes by N degrees relative to a chord line of the main blade element, an angle of a resultant air inflow to the slat changes by only up to N/2 degrees relative to a chord line of the slat throughout a variation of at least 8° in an inflow angle to the primary blade element.

7. The wind turbine blade of claim 6, wherein the slat is spaced from a suction side of the main blade element by distance of 5% to 10% of a selected chord length of the main blade element along a radial span of the slat, and the slat is disposed within the zone of reduced inflow angle variation throughout the radial span of the slat.

8. The wind turbine blade of claim 1, further wherein the slat is attached to a spinner of a hub of the main blade element.

9. The wind turbine blade of claim 1, wherein, for each transverse section through the slat and main blade element, a chord line of the slat forms an angle with a respective chord line of the main blade element of 10 to 30 degrees.

10. The wind turbine blade of claim 9, wherein said angle decreases with increasing distance from a root of the main blade element via a twist in the slat that exceeds a corresponding twist in the main blade element along a radial span of the slat.

11. The wind turbine blade of claim 1, further comprising a splitter plate extending aft from the flatback trailing edge by a distance of at least 5% of a chord length of the slat.

12. The wind turbine blade of claim 11, wherein the splitter plate extends aft from the flatback trailing edge from a midpoint in the thickness of the flatback trailing edge.

13. The wind turbine blade of claim 11, wherein the splitter plate is oriented normally ±20° to the flatback trailing edge.

14. The wind turbine blade of claim 11, wherein the splitter plate is angled toward the main blade element at an angle of up to 30 degrees relative to a camber line of the flatback slat.

15. The wind turbine blade of claim 11, wherein the splitter plate extends aft from the flatback trailing edge flush with a suction side of the slat, and forms an aft extension of the suction side of the slat.

16. The wind turbine blade of claim 11, wherein the splitter plate migrates from a midpoint on the thickness of the flatback trailing edge at an inboard end of the slat to an upper part of the flatback trailing edge at an outboard end of the slat.

17. The wind turbine blade of claim 1, further comprising a support structure attaching the slat to a suction side spar cap of the main blade element.

18. A wind turbine blade comprising:
a main blade element comprising a radially inboard portion; and
a flatback slat comprising a flatback trailing edge, wherein the flatback slat is spaced proximate the main blade element along a radial span of the inboard portion in a transverse sectional view thereof;
wherein at least a leading edge of the slat is disposed within a zone of reduced inflow angle variation, wherein, when an angle of an operational air inflow to the main blade element changes by N degrees relative to a chord line of the main blade element, an angle of a resultant air inflow to the slat changes by only up to N/2 degrees relative to a chord line of the slat throughout a variation of at least 8° in an inflow angle to the primary blade element.

19. A wind turbine blade comprising:
a main blade element comprising a radially inboard portion;
a flatback slat comprising a flatback trailing edge, wherein the flatback slat is spaced proximate the main blade element along a radial span of the inboard portion in a transverse sectional view thereof; and
a splitter plate extending aft from the flatback trailing edge by a distance of at least 5% of a chord length of the slat.

20. The wind turbine blade of claim 19, wherein the splitter plate extends aft from the flatback trailing edge from a midpoint in the thickness of the flatback trailing edge.

\* \* \* \* \*